US012781832B2

(12) United States Patent
Tsukiyoshi et al.

(10) Patent No.: US 12,781,832 B2
(45) Date of Patent: Nov. 3, 2026

(54) GUIDE DEVICE FOR LONG OBJECT

(71) Applicant: TSUBAKIMOTO CHAIN CO., Osaka (JP)

(72) Inventors: Keiichi Tsukiyoshi, Osaka (JP); Masashi Kunii, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 331 days.

(21) Appl. No.: 18/715,954

(22) PCT Filed: Nov. 25, 2022

(86) PCT No.: PCT/JP2022/043604
§ 371 (c)(1),
(2) Date: Jun. 3, 2024

(87) PCT Pub. No.: WO2023/106139
PCT Pub. Date: Jun. 15, 2023

(65) Prior Publication Data

US 2025/0043889 A1 Feb. 6, 2025

(30) Foreign Application Priority Data

Dec. 7, 2021 (JP) ................................ 2021-198621

(51) Int. Cl.
*F16G 13/16* (2006.01)
*F16L 3/015* (2006.01)
(Continued)

(52) U.S. Cl.
CPC .............. *F16G 13/16* (2013.01); *F16L 3/015* (2013.01); *F16L 3/23* (2013.01); *H02G 11/00* (2013.01);
(Continued)

(58) Field of Classification Search
CPC ... F16G 13/16; F16L 3/01; F16L 3/015; F16L 3/1091; F16L 3/23; F16L 3/26;
(Continued)

(56) References Cited

U.S. PATENT DOCUMENTS 3,517,702 A * 6/1970 Omer .................. H02G 3/0481 174/DIG. 11
4,198,812 A * 4/1980 Hennig .................. F16G 13/16 248/51
(Continued)

FOREIGN PATENT DOCUMENTS

DE 202019100169 U1 2/2020
JP 2021-97480 A 6/2021
(Continued)

OTHER PUBLICATIONS

International Search Report dated Jan. 10, 2023, issued in counterpart International Application No. PCT/JP2022/043604. (2 pages).
(Continued)

*Primary Examiner* — Richard K. Durden
(74) *Attorney, Agent, or Firm* — WHDA, LLP

(57) ABSTRACT

A guide device for a long object includes a belt-shaped unit. The belt-shaped unit includes a first tubular member and a second tubular member. The first tubular member accommodates an elongated support member. The second tubular member accommodates a long object having flexibility. The second tubular member is shorter than the first tubular member. At least at one end of the belt-shaped unit, the first tubular member and the second tubular member are integrated with one another into the belt shape in a state in which an end of the first tubular member extends farther than an end of the second tubular member in a lengthwise direction of the belt-shaped unit.

5 Claims, 6 Drawing Sheets

(51) Int. Cl.
*F16L 3/23* (2006.01)
*H02G 3/04* (2006.01)
*H02G 11/00* (2006.01)

(52) U.S. Cl.
CPC ......... *H02G 11/006* (2013.01); *H02G 3/0487* (2013.01)

(58) Field of Classification Search
CPC .... H02G 3/0487; H02G 11/00; H02G 11/003; H02G 11/006
USPC .......................................................... 248/68.1
See application file for complete search history.

(56) References Cited

U.S. PATENT DOCUMENTS

| | | | | |
|---|---|---|---|---|
| 4,944,976 | A * | 7/1990 | Plummer, III | H02G 3/0481 178/92 |
| 8,561,949 | B2 * | 10/2013 | Komiya | F16L 3/015 248/68.1 |
| 8,859,898 | B2 * | 10/2014 | Frye | H02G 3/0481 174/99 R |
| 9,083,159 | B2 * | 7/2015 | Takeuchi | H02G 3/0475 |
| 10,083,777 | B2 * | 9/2018 | Tetsuka | F16G 13/18 |
| 10,192,654 | B2 * | 1/2019 | Sung | H01B 7/0823 |
| 10,221,919 | B2 * | 3/2019 | Tetsuka | F16L 3/015 |
| 10,311,999 | B2 * | 6/2019 | Sung | H02G 11/00 |
| 10,718,407 | B2 * | 7/2020 | Tetsuka | F16G 13/06 |
| 12,442,480 | B2 * | 10/2025 | Tsukiyoshi | H02G 11/006 |
| 2011/0240805 | A1 * | 10/2011 | Komiya | H02G 11/006 248/68.1 |
| 2019/0338882 | A1 * | 11/2019 | Fukuda | H02G 3/0481 |
| 2020/0284318 | A1 * | 9/2020 | Bae | F16G 3/08 |
| 2022/0094150 | A1 * | 3/2022 | Yoon | H02G 11/006 |
| 2022/0149556 | A1 | 5/2022 | Hermey et al. | |
| 2022/0397214 | A1 | 12/2022 | Tanaka et al. | |
| 2024/0133401 | A1 * | 4/2024 | Takahashi | F16B 2/12 |

FOREIGN PATENT DOCUMENTS

| | | | | | |
|---|---|---|---|---|---|
| KR | 20160125774 | A | * | 11/2016 | H02G 3/0487 |
| KR | 101765509 | B1 | * | 8/2017 | H01B 7/18 |
| KR | 20180068441 | A | * | 6/2018 | F16G 13/16 |
| KR | 101983056 | B1 | * | 5/2019 | F16L 55/00 |
| KR | 20210004117 | A | * | 1/2021 | H02G 3/0487 |

OTHER PUBLICATIONS

Office Action dated Apr. 22, 2026, issued in counterpart DE Application No. 112022005826.9, with English translation. (8 pages).

* cited by examiner

GUIDE DEVICE FOR LONG OBJECT

CROSS-REFERENCE TO RELATED APPLICATIONS

This application is national stage application of International Application No. PCT/JP2022/043604, filed on Nov. 25, 2022, which claims the benefit of priority from Japanese Patent Application No. 2021-198621, filed on Dec. 7, 2021, the entire contents of each of which are incorporated herein by reference.

TECHNICAL FIELD

The present disclosure relates to a guide device for a long object, such as a flexible cable for feeding power to or a hose for feeding fluid to a movable unit in a machine tool or the like. The guide device guides the long object, inserted into a flexible tubular member, in accordance with movement of the movable unit while protecting the long object.

BACKGROUND ART

Patent Literature 1 describes an example of a long object guide device including a belt-shaped unit in which flexible tubular members, each having the form of an elongated cylinder, are arranged parallel to one another. Adjacent ones of the tubular members are coupled together such that all the tubular members are integrated. Each of the tubular members of the belt-shaped unit located at opposite ends in an arrangement direction accommodates a long articulated support member. The articulated support member is allowed to bend toward one side in a direction intersecting with a lengthwise direction of the articulated support member within a predetermined range, and restricted from bending toward the other side opposite to the bending side. Each of the tubular members of the belt-shaped unit, except for the ones accommodating the articulated support members, accommodates a cable. The cable, which is an example of a long object, is formed by covering an electric wire with an insulator.

CITATION LIST

Patent Literature

Patent Literature 1: Japanese Laid-Open Patent Publication No. 2021-97480

SUMMARY OF INVENTION

Technical Problem

The long object guide device may be fixed to an installation surface or the like of a movable unit or equipment included in a machine tool in a state in which lengthwise ends of the belt-shaped unit are held by clamping devices. Each clamping device entirely covers a corresponding end of the belt-shaped unit in a widthwise direction. In this case, for example, when the tubular member accommodating the long object has a larger cross-sectional shape than the tubular member accommodating the articulated support member, a clamping force of the clamping device would be applied only to the tubular member accommodating the long object. Application of such a clamping force may unnecessarily deform the tubular member accommodating the long object or compress the long object in the tubular member.

In this case, a spacer may be arranged between a clamping member of the clamping device and an outer circumferential surface of the tubular member accommodating the articulated support member so that the clamping force of the clamping device will not be applied to the tubular member accommodating the long object. However, such arrangement of the spacer unnecessarily increases the number of parts for holding the end of the belt-shaped unit with the clamping device.

Solution to Problem

A guide device for a long object that solves the above problem includes a belt-shaped unit in which elongated tubular members, having flexibility, are integrated with one another into a belt shape. The belt-shaped unit includes a first tubular member and a second tubular member. The first tubular member accommodates an elongated support member. The elongated support member is allowed to bend toward one side in a direction intersecting with a lengthwise direction of the elongated support member and restricted from bending toward the other side opposite to the one side. The second tubular member accommodates a long object having flexibility. The guide device is configured to guide the long object in accordance with movement of the belt-shaped unit while protecting the long object with the second tubular member. The second tubular member is shorter than the first tubular member. At least at one end of the belt-shaped unit, the first tubular member and the second tubular member are integrated with one another into the belt shape in a state in which an end of the first tubular member extends farther than an end of the second tubular member in a lengthwise direction of the belt-shaped unit.

DESCRIPTION OF EMBODIMENTS

A long object guide device in accordance with an embodiment will now be described with reference to the drawings.

Belt-Shaped Unit

Figure 1:
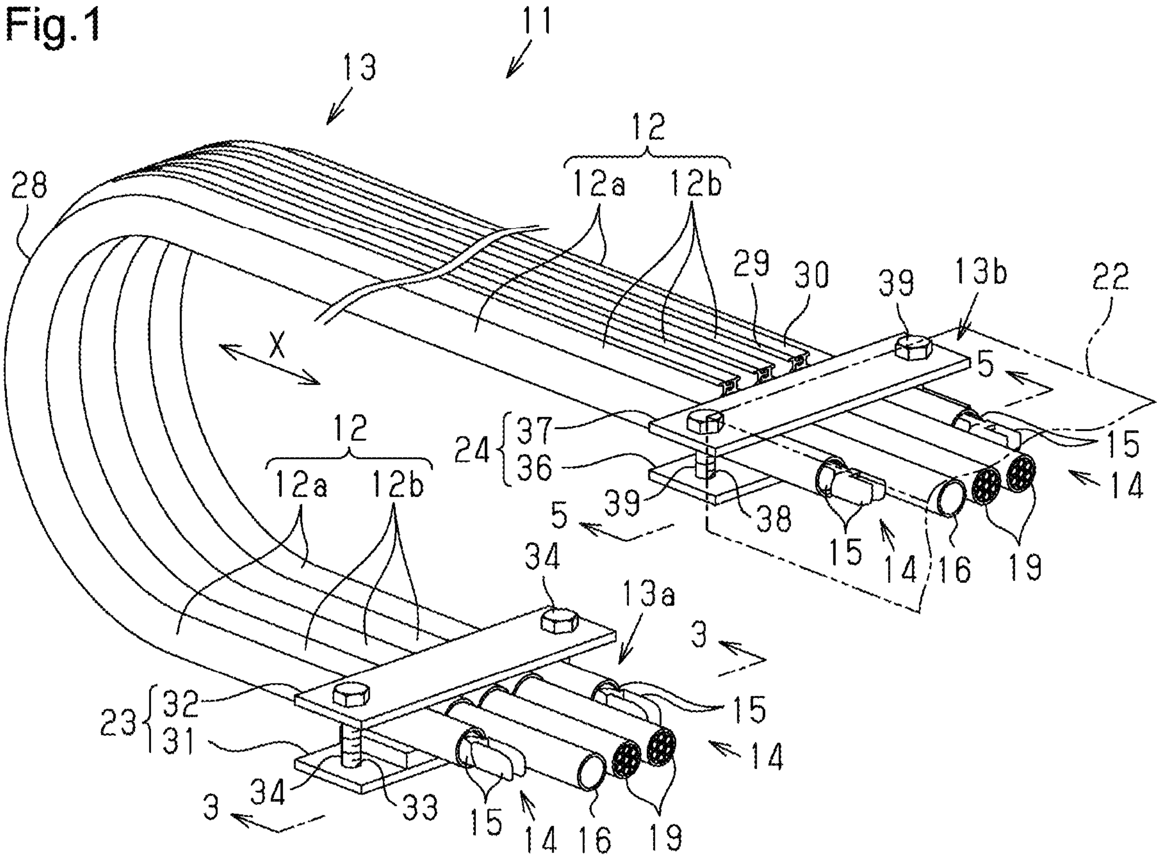
FIG. 1 is a perspective view, with a part cut away, schematically showing a long object guide device in accordance with an embodiment.

As shown in FIG. 1, a guide device 11 for a long object includes a belt-shaped unit 13 in which flexible tubular members 12, formed from synthetic resin, are integrated with one another into a belt shape. The belt-shaped unit 13 of the present embodiment includes five tubular members 12 (12*a*, 12*b*) including, for example, two first tubular members 12*a* and three second tubular members 12*b*. The five tubular members 12 (12*a*, 12*b*) of the belt-shaped unit 13 are arranged parallel to one another in a direction orthogonal to a lengthwise direction. Adjacent ones of the tubular members 12 (12*a*, 12*b*) are coupled together by fusion bonding so that the tubular members 12 (12*a*, 12*b*) are all integrated into the belt shape. The belt-shaped unit 13 does not have to be formed by fusion bonding the adjacent tubular members 12 (12*a*, 12*b*), and may be formed through injection-molding the tubular members 12 (12*a*, 12*b*) such that the tubular members 12 (12*a*, 12*b*) are arranged next to one another and integrated with one another. Alternatively, the tubular members 12 (12*a*, 12*b*) may be integrated into the belt shape, for example, through engagement of grooves and protrusions arranged on outer circumferential surfaces of the tubular members 12 (12*a*, 12*b*) in the lengthwise direction.

First Tubular Member

The two first tubular members 12*a* of the five tubular members 12 (12*a*, 12*b*), forming the belt-shaped unit 13, are located at opposite ends in an arrangement direction corresponding to a widthwise direction of the belt-shaped unit 13. Each of the first tubular members 12*a* is an elongated cylindrical member having a certain length. An articulated support member 14 is inserted into the first tubular member 12*a* such that the articulated support member 14 contacts the inner circumferential surface of the first tubular member 12*a*. The articulated support member 14 is longer than the first tubular member 12*a*. The articulated support member 14 is an elongated bendable support member that includes link members 15 arranged in series. Adjacent ones of the link members 15 are connected to each other in a pivotal manner. The articulated support member 14 is allowed to bend toward one side in a direction intersecting with the lengthwise direction, which is a series-arrangement direction, within a predetermined range up to a set bend radius. The articulated support member is restricted from bending to the other side opposite to the bending side. In the present embodiment, when the belt-shaped unit 13 is bent into a semi-circular shape as shown in FIG. 1, the articulated support member 14 is allowed to bend toward the inner peripheral side and is restricted from bending toward the opposite outer peripheral side.

Second Tubular Member

The three second tubular members 12*b* of the five tubular members 12 (12*a*, 12*b*), forming the belt-shaped unit 13, are arranged between the two first tubular members 12*a*, which are located at the opposite ends of the belt-shaped unit 13 in the widthwise direction. Each of the second tubular members 12*b* is an elongated cylindrical member designed to have a smaller length than the first tubular member 12*a*. That is, the second tubular member 12*b* is shorter than the first tubular member 12*a*. At an end of the belt-shaped unit 13, the second tubular members 12*b* and the first tubular members 12*a* are arranged parallel to one another and coupled together such that ends of the first tubular members 12*a* extend farther than ends of the second tubular members 12*b* in the lengthwise direction of the belt-shaped unit 13. In other words, at the end of the belt-shaped unit 13, the first tubular members 12*a* and the second tubular members 12*b* are arranged next to one another and coupled together such that the ends of the second tubular members 12*b* are located closer to a central part of the belt-shaped unit 13 than the ends of the first tubular members 12*a* in the lengthwise direction.

A rubber hose 16, serving as an example of a flexible long object, is inserted into the second tubular member 12*b* located at the left-most side of the three second tubular members 12*b* as shown in FIG. 1. The hose 16 is configured to transmit pressure, such as air pressure, hydraulic pressure, or the like. Further, a cable 19, serving as an example of a long object, is inserted into each of the two second tubular members 12*b* located in the middle and the right-most side of the three second tubular members 12*b* as shown in FIG. 1. The cable 19 is formed by covering bundled electric wires 17 (for example, seven wires) with an insulator 18. The hose 16 and the cables 19 are inserted into the second tubular members 12*b* such that two opposite ends of the hose 16 and two opposite ends of the cable 19 project out of corresponding ends of the second tubular members 12*b* in the lengthwise direction.

Long Object Guide Device in Used State

Figure 2:
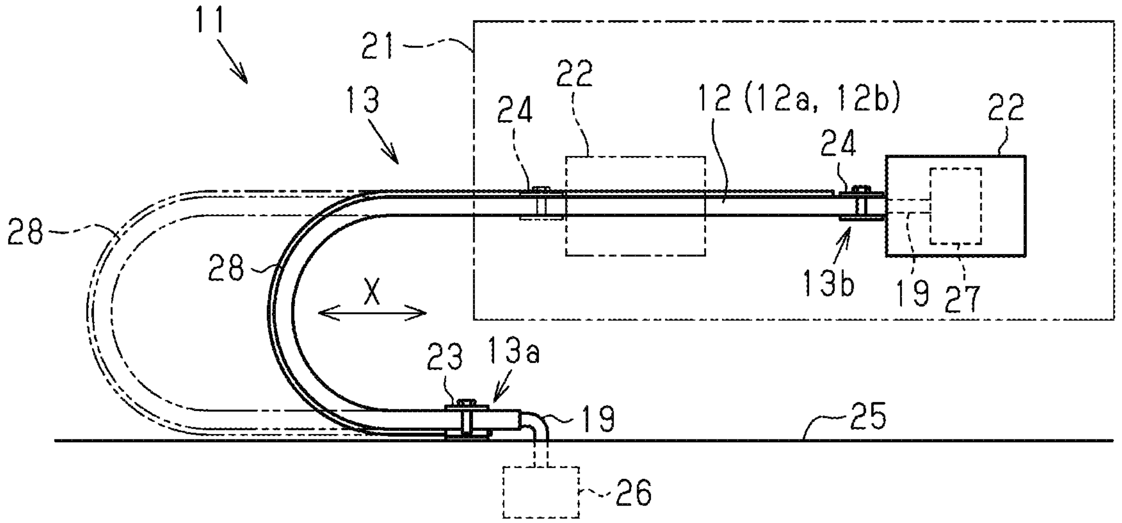
FIG. 2 is a side view schematically showing the long object guide device in a used state.

As shown in FIG. 2, the hose 16 and the cables 19 are laid out to supply pressure and power to a movable unit 22 of equipment 21, such as a machine tool or the like. The long object guide device 11 is used to guide the hose 16 and the cables 19 in accordance with movement of the movable unit 22 while protecting the hose 16 and the cables 19. The belt-shaped unit 13 includes a first end 13*a* and a second end 13*b* in the lengthwise direction. The first end 13*a* of the belt-shaped unit 13 is fixed in a state held by a first clamping device 23, and the second end 13*b* of the belt-shaped unit 13 is fixed in a state held by the second clamping device 24. In this case, the first end 13*a* of the belt-shaped unit 13 is a fixed end that is immovably fixed in a state held by the first clamping device 23. The second end 13*b* of the belt-shaped unit 13 is fixed to the movable unit 22 in a state held by the second clamping device 24. Thus, the second end 13*b* of the belt-shaped unit 13 is a movable end that is movable in a moving direction X of the movable unit 22.

Specifically, the first end 13*a* of the belt-shaped unit 13 in the lengthwise direction is fixed by the first clamping device 23 to a predetermined position on an installation surface 25 of the equipment 21. The installation surface 25 extends in a direction parallel to the moving direction X of the movable unit 22. At the first end 13*a* of the belt-shaped unit 13 in the lengthwise direction, the end of the cable 19 projecting out of the end of the second tubular member 12*b* is connected to a power supply 26 arranged on the installation surface 25. The second end 13*b* of the belt-shaped unit 13 in the lengthwise direction is fixed by the second clamping device 24 to the movable unit 22 of the equipment 21. At the second end 13*b* of the belt-shaped unit 13 in the lengthwise direction, the end of the cable 19 projecting out of the end of the second tubular member 12*b* is connected to an electric device 27 included in the movable unit 22. The pressure-transmitting hose 16 includes one end connected to a pressure source (not shown) and the other end connected to a cylinder mechanism (not shown) or the like arranged in the movable unit 22.

As shown in FIGS. 1 and 2, the belt-shaped unit 13 includes a curved portion 28 between the first end 13*a* and the second end 13*b* in the lengthwise direction. The curved portion 28 is curved toward the side opposite to the second end 13*b*, and has the form of a semicircular arc at a position farther from the second end 13*b* than the first end 13*a* in the moving direction X of the movable unit 22. A portion of the belt-shaped unit 13 between the first end 13*a* and the curved portion 28 in the lengthwise direction extends along the installation surface 25. A portion of the belt-shaped unit 13 between the second end 13*b* and the curved portion 28 in the lengthwise direction extends parallel to the installation surface 25 at a height at which the movable unit 22 is moved. The curved portion 28 of the belt-shaped unit 13 is moved in the moving direction X of the movable unit 22 as the second end 13*b* moves together with the movable unit 22 of the equipment 21.

First Joint Portion and Second Joint Portion

The second tubular members 12*b* of the belt-shaped unit 13, accommodating the hose 16 and the cables 19, each include a groove 29 and a protrusion 30 extending in the lengthwise direction of the second tubular members 12*b*. The groove 29 and the protrusion 30 are arranged adjacent to each other in a circumferential direction of the second tubular members 12*b*. Thus, in an unfolded state in which the groove 29 and the protrusion 30 are disengaged from each other, each second tubular member 12*b* has the form of a strip. In the unfolded state of the second tubular member 12*b*, the groove 29, serving as an example of a first joint portion, is arranged in one edge of the second tubular member 12*b* in the widthwise direction, which intersects the lengthwise direction, and extends in the lengthwise direction of the second tubular member 12*b*. Further, in the unfolded state of the second tubular member 12*b*, the protrusion 30, serving as an example of a second joint portion, is arranged on the other edge of the second tubular member 12*b* in the widthwise direction and extends in the lengthwise direction of the second tubular member 12*b*. The protrusion 30 is configured to join to and disjoin from the first joint portion. The groove 29 and the protrusion 30 are formed integrally with the second tubular member 12*b*, which is formed from synthetic resin, through extrusion. In the present embodiment, the groove 29 and the protrusion 30 are arranged on the second tubular member 12*b* at a side corresponding to the outer periphery of the curved portion 28.

The clamping devices that hold the ends of the belt-shaped unit 13 will now be described. The first clamping device 23, which holds the first end 13*a* of the belt-shaped unit 13, will be described first with reference to FIG. 3. Then, the second clamping device 24, which holds the second end 13*b* of the belt-shaped unit 13, will be described with reference to FIGS. 4 and 5.

First Clamping Device

Figure 3:
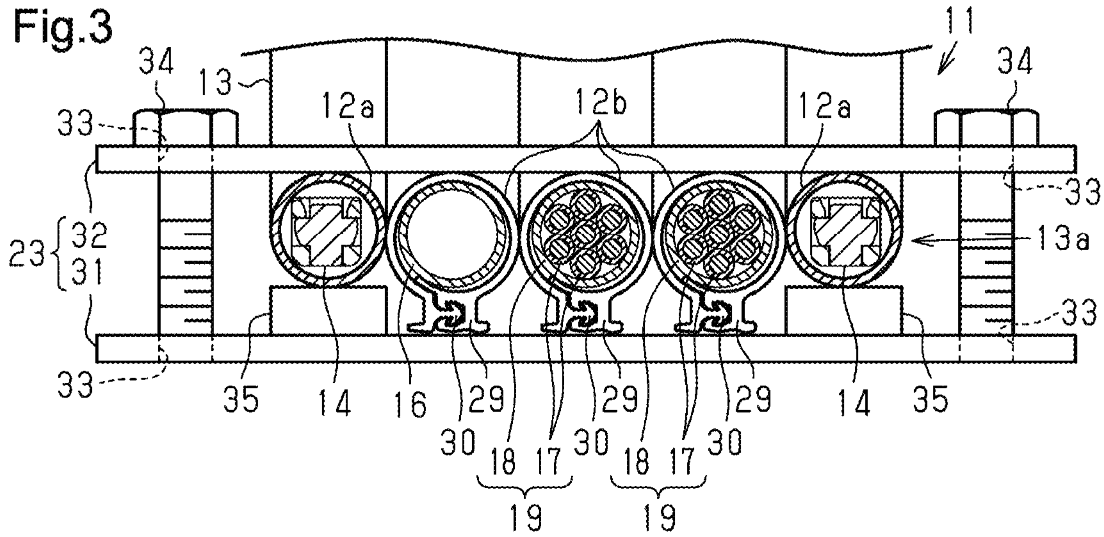
FIG. 3 is a cross-sectional view taken along line 3-3 in shown FIG. 1.

As shown in FIG. 3, the first clamping device 23 includes a first lower clamping member 31 and a first upper clamping member 32 that are both plate-shaped. The first lower clamping member 31 is fixed to the installation surface 25 of the equipment 21. The first upper clamping member 32 and the first lower clamping member 31 hold the first end 13*a* of the belt-shaped unit 13 in between. The first upper clamping member 32 is arranged above the first end 13*a* of the belt-shaped unit 13 and extends in the widthwise direction of the belt-shaped unit 13 such that the first upper clamping member 32 entirely covers the first end 13*a* of the belt-shaped unit 13 in the widthwise direction. In this case, the first upper clamping member 32 entirely covers the first end 13*a* of the belt-shaped unit 13 in the widthwise direction in a state in which the first upper clamping member 32 is in contact with the outer circumferential surfaces of the two first tubular members 12*a* and the three second tubular members 12*b* from above.

The two opposite ends of the first lower clamping member 31 and the two opposite ends of the first upper clamping member 32 each include a bolt hole 33. Bolts 34 are respectively fastened to the bolt holes 33 from above the first upper clamping member 32. This fixes the first end 13*a* of the belt-shaped unit 13 to the installation surface 25 in a state held between the first lower clamping member 31 and the first upper clamping member 32.

As shown in FIG. 3, when an outer shape of the end of the first tubular member 12*a* and an outer shape of the end of the second tubular member 12*b* in the belt-shaped unit 13 are compared in a cross section orthogonal to the lengthwise direction of the belt-shaped unit 13, the second tubular member 12*b* has a larger outer shape than the first tubular member 12*a*. In other words, the end of the second tubular member 12*b* has a greater outer dimension than the end of the first tubular member 12*a* in an up-down direction that corresponds to a direction in which a clamping force applied by the first clamping device 23 acts on the first end 13*a* of the belt-shaped unit 13.

Further, at the first end 13*a* of the belt-shaped unit 13, the groove 29 and the protrusion 30 of the second tubular member 12*b* project downward from the outer circumferential surface of the second tubular member 12*b* farther than the outer circumferential surface of the first tubular member 12*a*, and contact the first lower clamping member 31. Specifically, an upper part of the outer circumferential surface of the second tubular member 12*b* contacts a lower surface of the first upper clamping member 32, and the groove 29 and the protrusion 30 located at a lower part of the outer circumferential surface of the second tubular member 12*b* contact an upper surface of the first lower clamping member 31. In contrast, although an upper part of the outer circumferential surface of the first tubular member 12*a* contacts the lower surface of the first upper clamping member 32, a lower part of the outer circumferential surface of the first tubular member 12*a* does not contact the upper surface of the first lower clamping member 31.

Thus, when the bolts 34 are turned in a fastening direction in a state in which the first end 13*a* of the belt-shaped unit 13 is held between the first lower clamping member 31 and the first upper clamping member 32, the clamping force of the first clamping device 23 would be applied only to the second tubular members 12*b*. In other words, such a clamping force would be applied to the second tubular members 12*b* accommodating the hose 16 and the cables 19. Accordingly, in the present embodiment, spacers 35 are arranged between the first tubular members 12*a* and the first lower clamping member 31 so that the clamping force of the first clamping device 23 will be applied only to the first tubular members 12*a* accommodating the articulated support members 14.

Second Clamping Device

Figure 4:
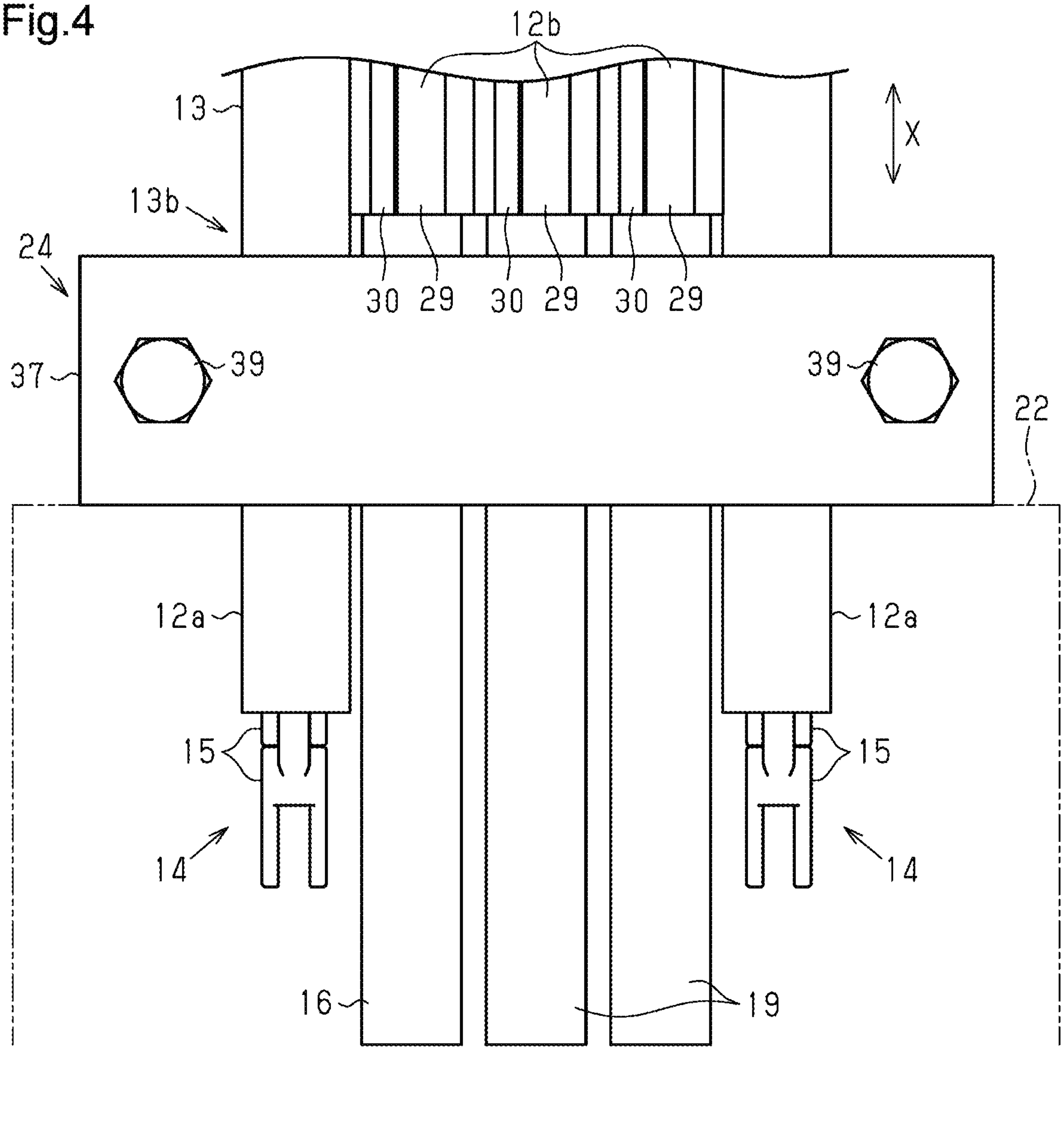
FIG. 4 is a plan view showing a movable end of a belt-shaped unit in a state held by a clamping device.
Figure 5:
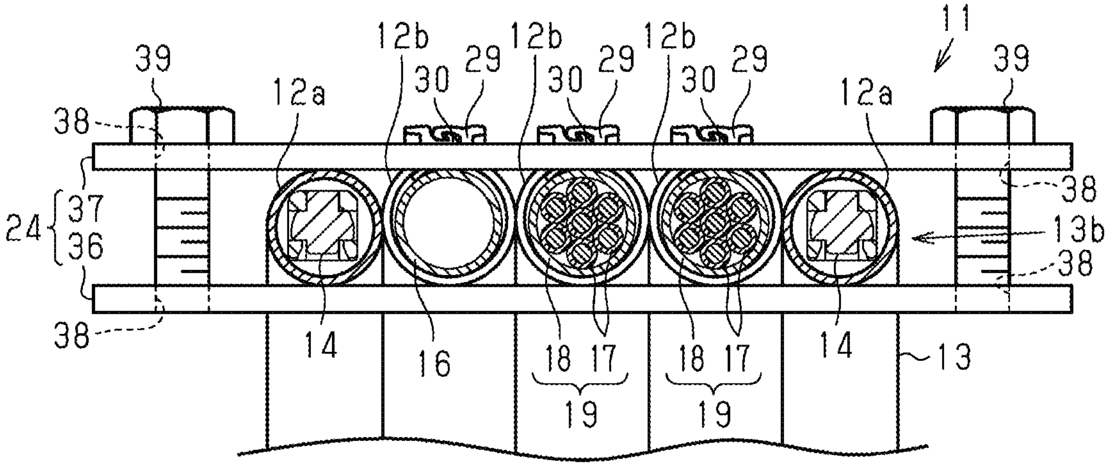
FIG. 5 is a cross-sectional view taken along line 5-5 shown in FIG. 1.

As shown in FIGS. 4 and 5, the second clamping device 24 includes a second lower clamping member 36 and a second upper clamping member 37 that are both plate-shaped. The second lower clamping member 36 is fixed to the movable unit 22 of the equipment 21. The second upper clamping member 37 and the second lower clamping member 36 hold the second end 13*b* of the belt-shaped unit 13 in between. The second upper clamping member 37 is arranged above the second end 13*b* of the belt-shaped unit 13 and extends in the widthwise direction of the belt-shaped unit 13 such that the second upper clamping member 37 entirely covers the second end 13*b* of the belt-shaped unit 13 in the widthwise direction. In this case, at the second end 13*b* of the belt-shaped unit 13, the second upper clamping member 37 contacts the outer circumferential surfaces of the two first tubular members 12*a* from above, but does not contact the outer circumferential surfaces of the three second tubular members 12*b* from above. Further, in this state, the second upper clamping member 37 entirely covers the second end 13*b* of the belt-shaped unit 13 in the widthwise direction.

At the second end 13*b* of the belt-shaped unit 13, the end of the first tubular member 12*a* is located at the side opposite to the curved portion 28 with respect to the second clamping device 24 in the lengthwise direction of the belt-shaped unit 13. In contrast, the end of the second tubular member 12*b* is located closer to the central part of the belt-shaped unit 13, where the curved portion 28 of the belt-shaped unit 13 is located, than the second clamping device 24 in the lengthwise direction of the belt-shaped unit 13. Thus, at the second end 13*b* of the belt-shaped unit 13, the second tubular member 12*b* is not held between the second lower clamping member 36 and the second upper clamping member 37.

In this case, as shown in FIG. 5, at the second end 13*b* of the belt-shaped unit 13, the first tubular members 12*a* located at the opposite ends of the belt-shaped unit 13 in the widthwise direction are held between the second lower clamping member 36 and the second upper clamping member 37 from above and below. On the other hand, the second tubular members 12*b* are not held between the second lower clamping member 36 and the second upper clamping member 37 from above and below since the ends of the second tubular members 12*b* are located closer to the curved portion 28 than the second clamping device 24 in the lengthwise direction of the belt-shaped unit 13. Thus, at the second end 13*b* of the belt-shaped unit 13, the groove 29 and the protrusion 30 arranged on the outer circumferential surface of the second tubular member 12*b* can be disengaged from each other without removing the second upper clamping member 37.

The two opposite ends of the second lower clamping member 36 and the two opposite ends of the second upper clamping member 37 each include a bolt hole 38. Bolts 39 are respectively fastened to the bolt holes 38 from above the second upper clamping member 37. This fixes the second end 13*b* of the belt-shaped unit 13 to the movable unit 22 in a state held between the second lower clamping member 36 and the second upper clamping member 37. In this case, even when the bolts 39 are turned in the fastening direction, the clamping force of the second clamping device 24 will be applied only to the first tubular members 12*a* and not to the second tubular members 12*b*.

Operation

The operation of the long object guide device 11 of the present embodiment will now be described.

As shown in FIGS. 1 and 2, when the first end 13*a* of the belt-shaped unit 13 is fixed to the installation surface 25 of the equipment 21 and the second end 13*b* of the belt-shaped unit 13 is fixed to the movable unit 22, the first clamping device 23 entirely covers one end of the belt-shaped unit 13 and the second clamping device 24 entirely covers the other end of the belt-shaped unit 13 in the widthwise direction.

In this case, at the first end 13*a* of the belt-shaped unit 13, the first lower clamping member 31 and the first upper clamping member 32 of the first clamping device 23 hold the ends of the first tubular members 12*a* and the ends of the second tubular members 12*b* in between. Nonetheless, the clamping force of the first clamping device 23 is applied only to the ends of the first tubular members 12*a* and the spacers 35, and not to the second tubular members 12*b*. In contrast, at the second end 13*b* of the belt-shaped unit 13, the second lower clamping member 36 and the second upper clamping member 37 of the second clamping device 24 hold only the ends of the first tubular members 12*a* in between, and not the ends of the second tubular members 12*b*. Thus, at the second end 13*b* of the belt-shaped unit 13, the clamping force of the second clamping device 24 is applied only to the first tubular members 12*a*, and not to the second tubular members 12*b*.

Further, when replacing the hose 16 or the cable 19 accommodated in the second tubular member 12*b* at the first end 13*a* of the belt-shaped unit 13, the bolts 34 in the bolt holes 33 of the first lower clamping member 31 are loosened. This removes the first upper clamping member 32, which entirely covers the ends of the first tubular members 12*a* and the ends of the second tubular members 12*b* in the widthwise direction. Then, the first end 13*a* of the belt-shaped unit 13 is lifted so as to curve upward, and the groove 29 and the protrusion 30 of the second tubular member 12*b* are disengaged from each other. Subsequently, the hose 16 or the cable 19 is removed from the second tubular member 12*b*, in which the groove 29 and the protrusion 30 are disengaged, and replaced with a new hose 16 or cable 19. In contrast, at the second end 13*b* of the belt-shaped unit 13, the hose 16 or the cable 19 accommodated in the second tubular member 12*b* can be replaced without removing the second upper clamping member 37 of the second clamping device 24.

Figure 6:
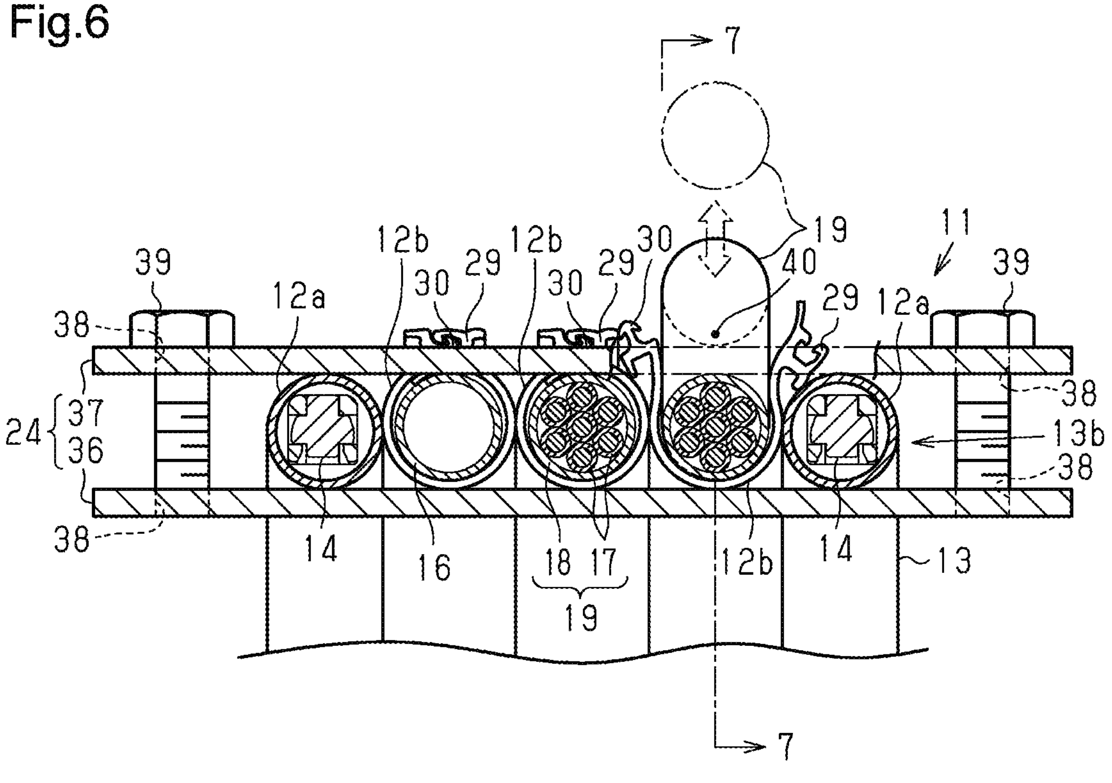
FIG. 6 is a cross-sectional view showing the movable end of the belt-shaped unit when replacing a long object.
Figure 7:
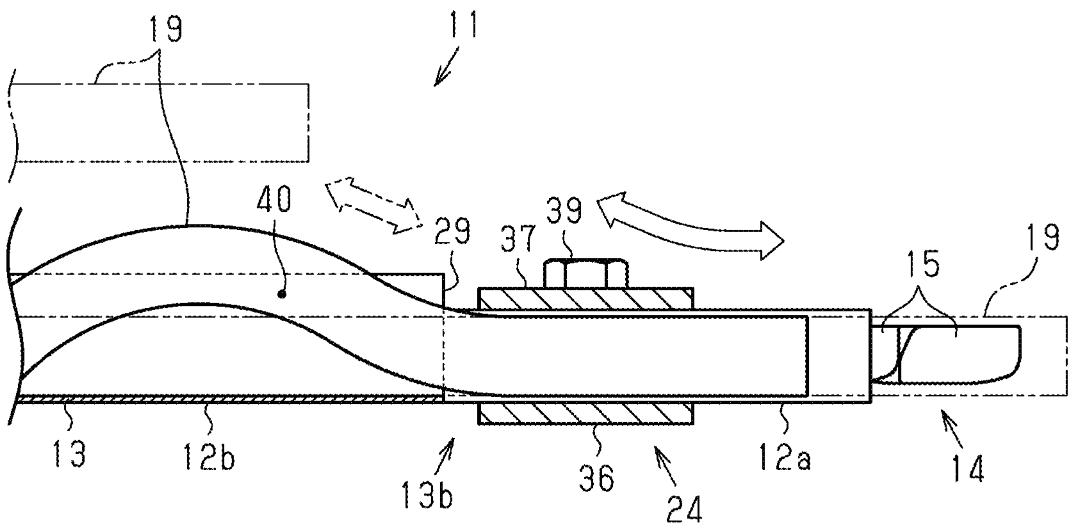
FIG. 7 is a cross-sectional view taken along line 7-7 shown in FIG. 6.

In this case, as shown in FIGS. 6 and 7, the groove 29 and the protrusion 30 of the second tubular member 12*b*, which accommodates the cable 19 to be replaced, for example, are disengaged from each other at a position closer to the curved portion 28 of the belt-shaped unit 13 than the second clamping device 24 in the lengthwise direction of the belt-shaped unit 13. This forms an opening 40 in the lengthwise direction of the second tubular member 12*b* between the groove 29 and the protrusion 30 of the second tubular member 12*b*, in which the groove 29 and the protrusion 30 are disengaged.

In this manner, as shown in FIG. 7, the old cable 19 indicated by the double-dashed lines inserted in the second tubular member 12*b* can be removed through the opening 40 in a hollow-arrow direction in the manner indicated by the solid lines. The replacement of the old cable 19 in the second tubular member 12*b* is completed when a new cable 19, indicated by the double-dashed lines at the upper part of FIG. 7, is placed into the second tubular member 12*b* through the opening 40 in a hollow-arrow direction. At the second end 13*b* of the belt-shaped unit 13, which is a movable end, it is troublesome to remove the second clamping device 24 from the second end 13*b* that may be moved unintentionally. However, in the present embodiment, such a removing operation is unnecessary.

Advantages (1) When the second clamping device 24 holds the second end 13*b* of the belt-shaped unit 13 and entirely covers the second end 13*b* of the belt-shaped unit 13 in the widthwise direction, if the second clamping device 24 holds only the ends of the first tubular members 12*a*, the clamping force of the second clamping device 24 will not be applied to the second tubular members 12*b*. In this case, the spacers 35 do not have to be arranged between the first tubular members 12*a* and the surface of the second clamping device 24 facing the first tubular members 12*a*. Thus, the long object guide device 11 guides the long objects, such as the hose 16 and the cable 19, in accordance with movement of the belt-shaped unit 13 while protecting the long objects in a state in which the second clamping device 24 appropriately holds the second end 13*b* of the belt-shaped unit 13. This avoids an unnecessary increase in the number of components.

(2) At the first end 13*a* and the second end 13*b* of the belt-shaped unit 13, the clamping forces of the first clamping device 23 and the second clamping device 24 are applied only to the first tubular members 12*a*, accommodating the articulated support members 14, and not to the second tubular members 12*b*, accommodating the long objects. Thus, the clamping forces of the first clamping device 23 and the second clamping device 24 will not be applied to the second tubular members 12*b* or the long objects, such as the hose 16 and the cable 19, accommodated in the second tubular members 12*b*.

(3) The second tubular member 12*b* may accommodate a long object, such as the hose 16 or the cable 19, having a relatively large diameter by increasing the inner diameter and the outer diameter of the second tubular member 12*b* to become greater than the inner diameter and the outer diameter of the first tubular member 12*a*. Even in this case, the clamping forces of the first clamping device 23 and the second clamping device 24 will not be applied to the hose 16 and the cable 19 accommodated in the second tubular members 12*b*.

(4) The long object in the second tubular member 12*b* can be replaced by disengaging the groove 29 and the protrusion 30 of the second tubular member 12*b* without removing the second clamping device 24 from the second end 13*b* of the belt-shaped unit 13.

Modified Examples

The above-described embodiment may be modified as follows. The configuration of above-described embodiment may be combined with any of the following modifications. Also, the following modifications can be combined with one another.

Figure 8:
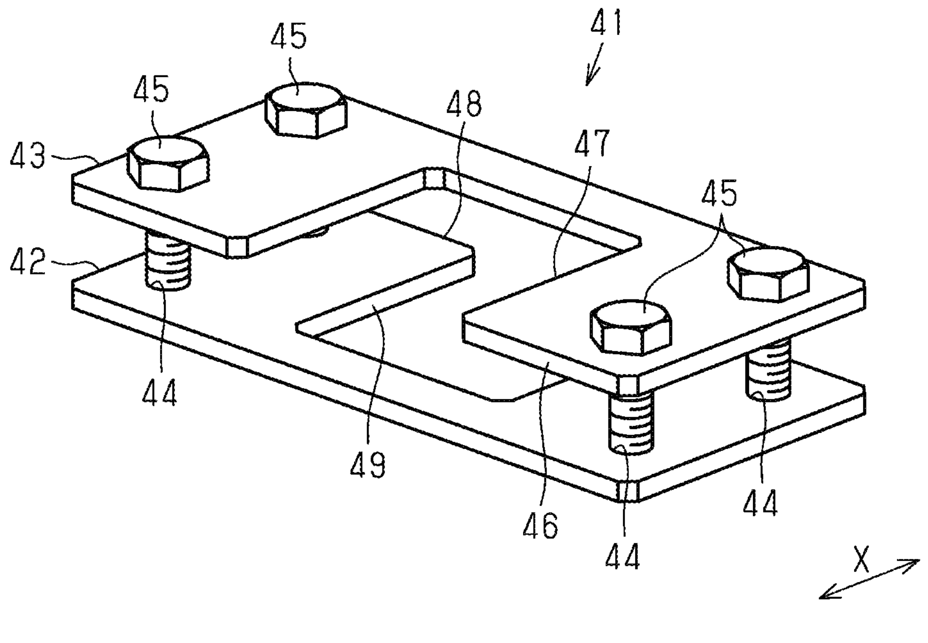
FIG. 8 is a perspective view showing a clamping device of a modified example.
Figure 9:
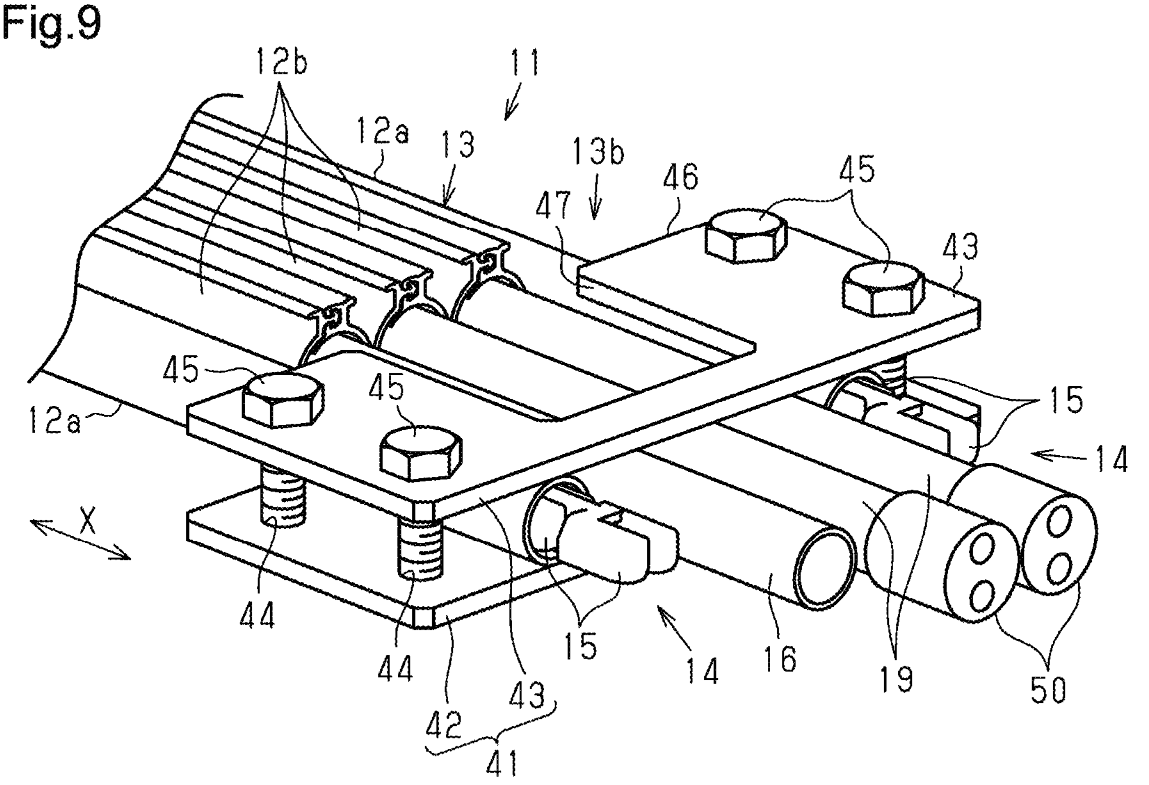
FIG. 9 is a perspective view showing a movable end of a belt-shaped unit in a state held by the clamping device of the modified example.

A clamping device 41 of a modified example shown in FIGS. 8 and 9 may be used to hold an end of the belt-shaped unit 13. The clamping device 41 includes a lower clamping member 42 and an upper clamping member 43. The lower clamping member 42 and the upper clamping member 43 have the form of a flat plate and are slightly wider than the first clamping device 23 and the second clamping device 24 of the above embodiment in the lengthwise direction of the belt-shaped unit 13. The four corners of the lower clamping member 42 and the four corners of the upper clamping member 43 each include a bolt hole 44. When bolts 45 are respectively fastened to the bolt holes 44 from above the upper clamping member 43, the end of the belt-shaped unit 13 will be held between the lower clamping member 42 and the upper clamping member 43.

FIG. 9 shows a state in which the clamping device 41 holds the second end 13*b*. The second end 13*b* is a movable one of the first end 13*a* and the second end 13*b* of the belt-shaped unit 13. Of the lower clamping member 42 and the upper clamping member 43, the upper clamping member 43 includes a cutout recess 47 in an edge 46 of the upper clamping member 43 located toward the groove 29 and the protrusion 30 of the second tubular member 12*b*. The edge 46 is one of the two edges of the upper clamping member 43 and is located toward the end of the second tubular member 12*b*. The two edges of the upper clamping member 43 extend in the widthwise direction of the belt-shaped unit 13. In contrast, the lower clamping member 42 includes a cutout recess 49 in an edge 48 of the lower clamping member 42. The edge 48 is one of the two edges of the lower clamping member 42 and is located toward the side opposite to the end of the second tubular member 12*b*. The two edges of the lower clamping member 42 extend two edges of the lower clamping member 42.

Figure 10:
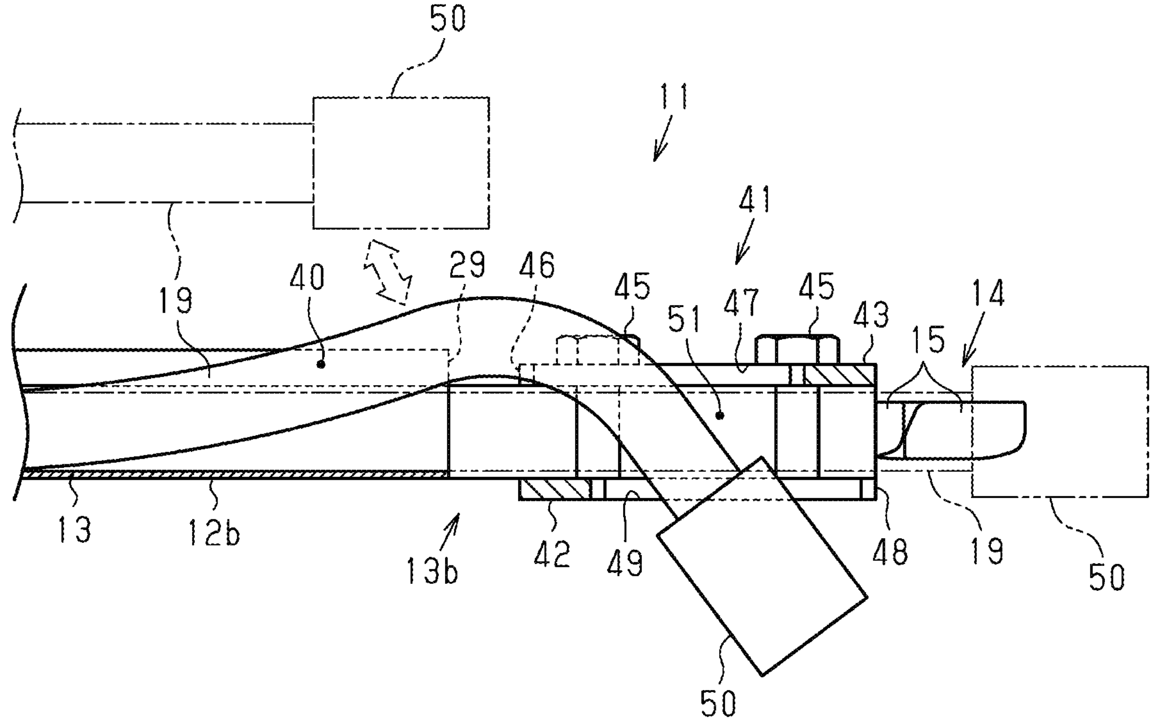
FIG. 10 is a cross-sectional view of the movable end of the belt-shaped unit shown in FIG. 9 when replacing a long object having a distal end fitted with a connector.

As shown in FIG. 10, the clamping device 41 of the present modified example allows the groove 29 and the protrusion 30 of the second tubular member 12*b* to be disengaged from each other without releasing the clamping of the second end 13*b* of the belt-shaped unit 13. Further, when replacing the long object in the second tubular member 12*b* from such a state, the cutout recess 47 in the edge 46 of the upper clamping member 43 allows passage of the end of the long object between the lower clamping member 42 and the upper clamping member 43.

As shown in FIGS. 9 and 10, the distal end of the long object may be fitted with a connector 50. The connector 50 may have a diameter that is greater than the distance between the lower clamping member 42 and the upper clamping member 43. Even in this case, the clamping device 41 of the present modified example allows passage of the connector 50 through a diagonal void 51 through the cutout recess 47 in the edge 46 of the upper clamping member 43 at one side and the cutout recess 49 in the edge 48 of the lower clamping member 42 at the other side. This facilitates replacement of the cable 19 in the second tubular member 12*b* even when the distal end of the cable 19 is fitted with the connector 50 having a relatively large diameter.

Figure 11:
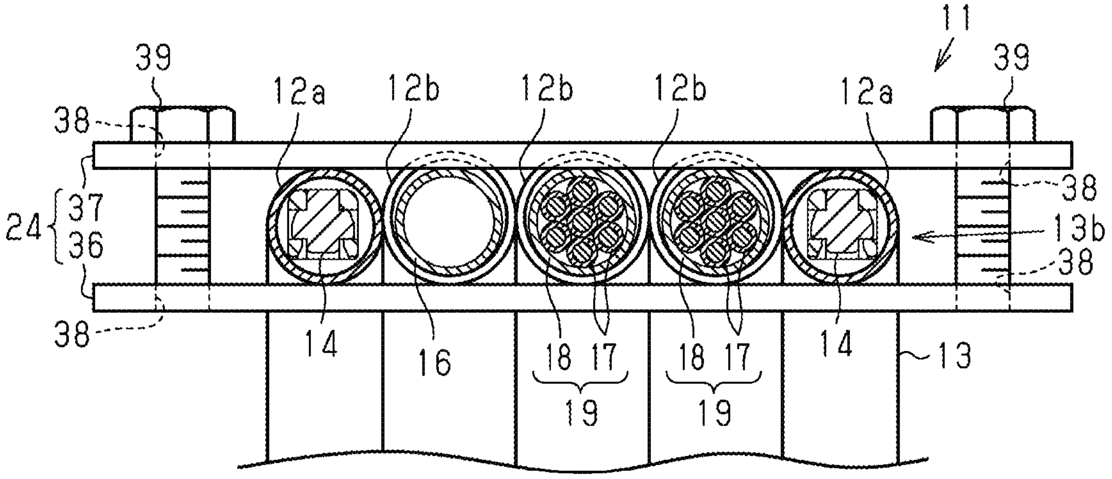
FIG. 11 is a cross-sectional view of a movable end of a belt-shaped unit in a long object guide device of another modified example.

As shown in FIG. 11, with a long object guide device 11 of the present modified example, the groove 29, serving as the first joint portion, and the protrusion 30, serving as the second joint portion, do not have to be arranged on the outer circumferential surfaces of the second tubular members 12*b* of the belt-shaped unit 13. In this case, even when the second tubular member 12*b* has a larger diameter than the first tubular member 12*a*, if the end of the second tubular member 12*b* is arranged to be closer to the curved portion 28 of the belt-shaped unit 13 than the second clamping device 24, the clamping force of the second clamping device 24 will not be applied to the second tubular member 12*b*.

The first end 13*a* of the belt-shaped unit 13 does not have to be held by the first clamping device 23 and may be held by the second clamping device 24 in the same manner as the second end 13*b*. In this case, it is preferred that the end of the second tubular member 12*b* at the first end 13*a* of the belt-shaped unit 13 be arranged closer to the curved portion 28 of the belt-shaped unit 13 than the second clamping device 24. This eliminates the need for arranging the spacers 35.

In the clamping device 41 of the modified example shown in FIGS. 8 to 10, if the distal end of the cable 19 accommodated in the second tubular member 12*b* does not include the connector 50 having a relatively large diameter, the cutout recess 49 may be omitted from the edge 48 of the lower clamping member 42.

In the clamping device 41 of the modified example shown in FIGS. 8 to 10, the cutout recess 47 or 49 may be arranged in at least one of the edge 46 of the upper clamping member 43 on one side, the edge of the upper clamping member 43 on the other side, the edge of the lower clamping member 42 on one side, and the edge 48 of lower clamping member 42 on the other side. For example, each of the four edges may include the cutout recess when the lower clamping member 42 and the upper clamping member 43 are even wider than the structure shown in FIGS. 8 to 10 in the lengthwise direction of the belt-shaped unit 13. Alternatively, only one of the four edges may include the cutout recess when the distal end of the cable 19 does not include the connector 50 having a large diameter.

In the clamping device 41 of the modified example shown in FIGS. 8 to 10, the cutout recesses 47 and 49 do not have to be rectangular and may have the form of other shape such as semicircle.

The first joint portion and the second joint portion of the second tubular member 12*b* may be strips of a hook-and-loop fastener or the like that are provided in overlapping end portions in the circumferential direction of the second tubular member 12*b*. The strips are joined together while being in planar contact with each other.

The second tubular members 12*b* of the belt-shaped unit 13 may have different diameters. Alternatively, the belt-shaped unit 13 may have only one second tubular member 12*b*. The present embodiment will have excellent advantages when at least one second tubular member 12*b* has a greater diameter or a greater cross-sectional shape than the first tubular member 12*a*, which accommodates the articulated support member 14.

The second tubular member 12*b* having a smaller diameter than the first tubular member 12*a* may have a configuration in which the cross-sectional shape of the second tubular member 12*b* is larger than the first tubular member 12*a*, for example, by having the groove 29 and the protrusion 30 on the outer circumferential surface.

The first tubular member 12*a* of the belt-shaped unit 13 accommodating the articulated support member 14 may be located at a position other than the opposite ends of the belt-shaped unit 13 in the widthwise direction, and coupled to the second tubular members 12*b* in parallel. The belt-shaped unit 13 may include one or three or more first tubular members 12*a*.

The long objects inserted into the three second tubular members 12*b* of the belt-shaped unit 13 may be a set of one cable 19 and two hoses 16, a set of three hoses 16, or a set of three cables 19.

The invention claimed is:

1. A guide device for a long object, wherein:

the guide device includes a belt-shaped unit in which elongated tubular members, having flexibility, are integrated with one another into a belt shape;

the belt-shaped unit includes a first tubular member and a second tubular member, the first tubular member accommodating an elongated support member, the elongated support member being allowed to bend toward one side in a direction intersecting with a lengthwise direction of the elongated support member and restricted from bending toward an other side opposite to the one side, the second tubular member accommodating a long object having flexibility; and the guide device is configured to guide the long object in accordance with movement of the belt-shaped unit while protecting the long object with the second tubular member, wherein:

the second tubular member is shorter than the first tubular member; and at least at one end of the belt-shaped unit, the first tubular member and the second tubular member are integrated with one another into the belt shape in a state in which an end of the first tubular member extends farther than an end of the second tubular member in a lengthwise direction of the belt-shaped unit.

2. The guide device according to claim 1, wherein:

a clamping device is arranged on the at least one end of the belt-shaped unit to entirely cover the belt-shaped unit in a widthwise direction; and at the at least one end of the belt-shaped unit where the clamping device is arranged, the end of the first tubular member is held by the clamping device, and the end of the second tubular member is located closer to a central part of the belt-shaped unit than the clamping device in the lengthwise direction of the belt-shaped unit.

3. The guide device according to claim 2, wherein when an outer shape of the end of the first tubular member and an outer shape of the end of the second tubular member are compared in a cross section orthogonal to the lengthwise direction of the belt-shaped unit, the end of the second tubular member has a greater outer dimension than the end of the first tubular member in a direction in which a clamping force of the clamping device is applied to the at least one end of the belt-shaped unit.

4. The guide device according to claim 1, wherein the second tubular member includes a first joint portion extending in a lengthwise direction of the second tubular member, and a second joint portion extending in the lengthwise direction of the second tubular member and configured to join to and disjoin from the first joint portion.

5. The guide device according to claim 4, wherein:

a clamping device is arranged on the at least one end of the belt-shaped unit to entirely cover the belt-shaped unit in a widthwise direction;

the clamping device includes two clamping members faced toward one another to hold the at least one end of the belt-shaped unit in between; and at least one of the two clamping members includes a cutout recess in at least one of two edges of the at least one of the two clamping members, where the two edges extend in the widthwise direction of the belt-shaped unit.

* * * * *